(12) United States Patent
Matsune

(10) Patent No.: US 7,933,979 B2
(45) Date of Patent: Apr. 26, 2011

(54) IDENTIFICATION INFORMATION CREATING METHOD, INFORMATION PROCESSING APPARATUS, COMPUTER PROGRAM PRODUCT, RECORDING DEVICE MONITORING METHOD, TERMINAL APPARATUS MANAGEMENT METHOD, AND COMMUNICATION NETWORK SYSTEM

(75) Inventor: Shinji Matsune, Hiroshima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/285,695

(22) Filed: Oct. 10, 2008

(65) Prior Publication Data

US 2009/0112968 A1 Apr. 30, 2009

Related U.S. Application Data

(62) Division of application No. 10/737,882, filed on Dec. 18, 2003, now Pat. No. 7,447,752.

(30) Foreign Application Priority Data

Dec. 25, 2002 (JP) ................................. 2002-374596

(51) Int. Cl.
*G06F 15/177* (2006.01)
(52) U.S. Cl. ........ 709/220; 709/224; 709/228; 709/248; 710/8; 710/104; 710/268
(58) Field of Classification Search .................. 709/220, 709/223, 229, 248, 224; 726/26
See application file for complete search history.

(56) References Cited

U.S. PATENT DOCUMENTS 5,553,245 A 9/1996 Su et al. ........................ 710/104
5,923,850 A 7/1999 Barroux ........................ 709/224
5,974,474 A 10/1999 Furner et al. ...................... 710/8

(Continued)

FOREIGN PATENT DOCUMENTS

JP 5-265832 10/1993

(Continued)

OTHER PUBLICATIONS

Japanese Patent Office Action, mailed Mar. 11, 2008 and issued in corresponding Japanese Patent Application No. 2002-374596.

(Continued)

*Primary Examiner* — Michael Won
(74) *Attorney, Agent, or Firm* — Staas & Halsey LLP

(57) ABSTRACT

A terminal apparatus generates a hash value from a sequence number based on a predetermined hash algorithm, and creates identification information from an IP address and/or a MAC address and the generated hash value based on a predetermined creation algorithm. Moreover, at the time of processing for shutdown or reboot, the terminal apparatus stores the current recording device information into a hard disk, and when booted next time, determines whether or not the current recording device information and the recording device information stored in the hard disk match with each other. Further, when booted, the terminal apparatus requests a response from another terminal apparatus in the network segment, and when there is not a response from another terminal apparatus, creates management information of terminal apparatuses including itself having been booted in the network segment. With this, spoofing as an authorized terminal apparatus can be prevented, a change of a recording medium can be monitored, and the traffic of the communication network needed for the management of the terminal apparatuses can be reduced.

4 Claims, 16 Drawing Sheets

U.S. PATENT DOCUMENTS

| | | | |
|---|---|---|---|
| 6,119,131 A * | 9/2000 | Cabrera et al. | 707/203 |
| 6,324,654 B1 * | 11/2001 | Wahl et al. | 714/6 |
| 6,742,025 B2 * | 5/2004 | Jennery et al. | 709/220 |
| 6,886,038 B1 | 4/2005 | Tabbara et al. | 709/223 |
| 7,007,077 B1 * | 2/2006 | Shinohara et al. | 709/220 |
| 7,062,550 B1 | 6/2006 | Hutchinson et al. | 709/224 |
| 7,219,140 B2 | 5/2007 | Marl et al. | 709/219 |
| 7,240,106 B2 | 7/2007 | Cochran et al. | 709/222 |
| 2003/0005432 A1 | 1/2003 | Ellis et al. | 725/13 |
| 2003/0126236 A1 | 7/2003 | Marl et al. | 709/220 |
| 2003/0140139 A1 | 7/2003 | Marejka et al. | 709/224 |
| 2003/0191823 A1 | 10/2003 | Bansal et al. | 709/220 |
| 2004/0128376 A1 | 7/2004 | Matsune et al. | 709/223 |

FOREIGN PATENT DOCUMENTS

| | | |
|---|---|---|
| JP | 2000-187646 | 7/2000 |
| JP | 2002/41362 | 2/2002 |
| JP | 2002-157523 | 5/2002 |
| JP | 2002/158673 | 5/2002 |
| JP | 2002-222173 | 8/2002 |
| JP | 2002-244856 | 8/2002 |
| WO | WO 00/51036 | 8/2000 |

OTHER PUBLICATIONS

U.S. Appl. No. 10/737,882, filed Dec. 18, 2003, Shinji Matsune et al., Fujitsu Limited.

* cited by examiner

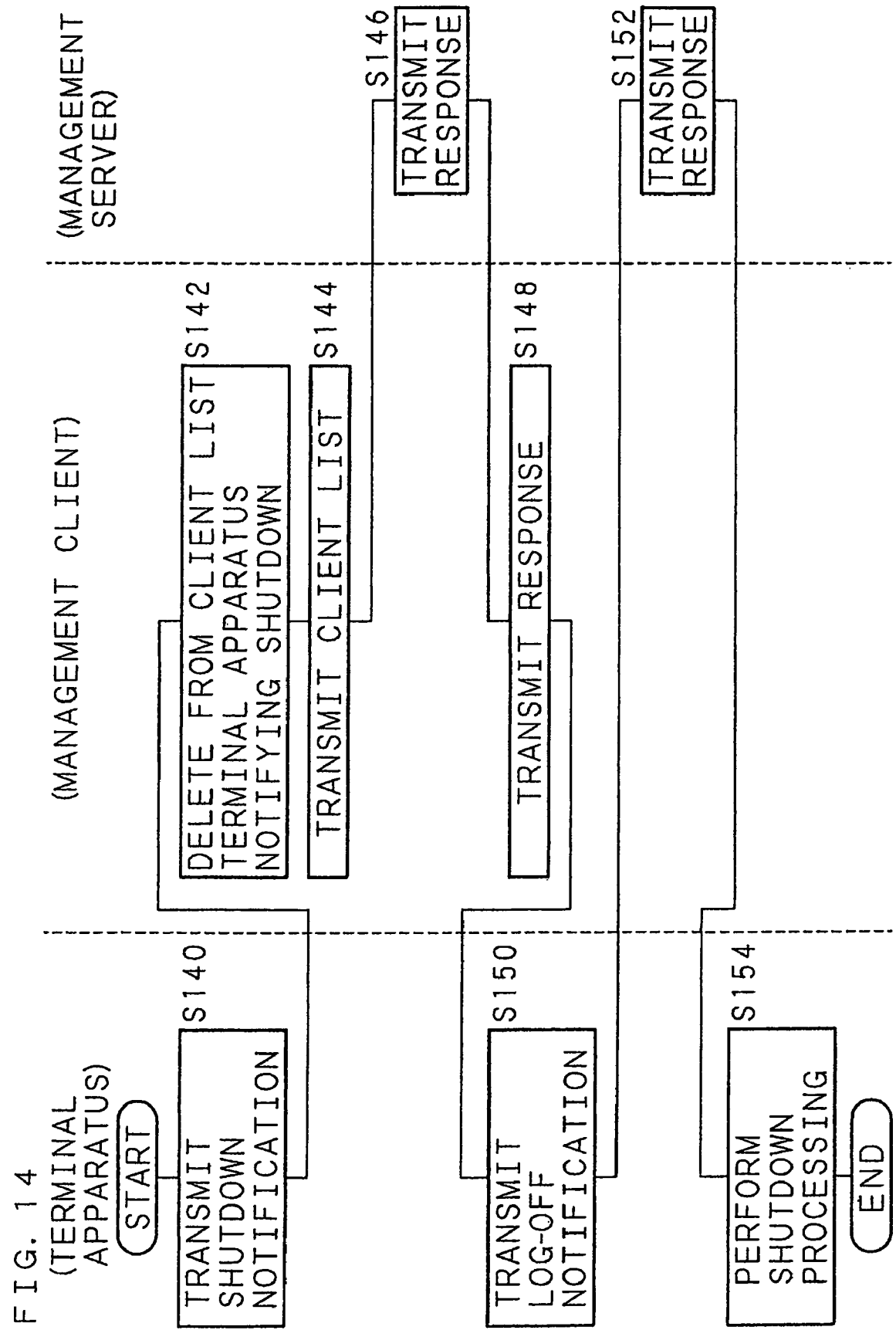

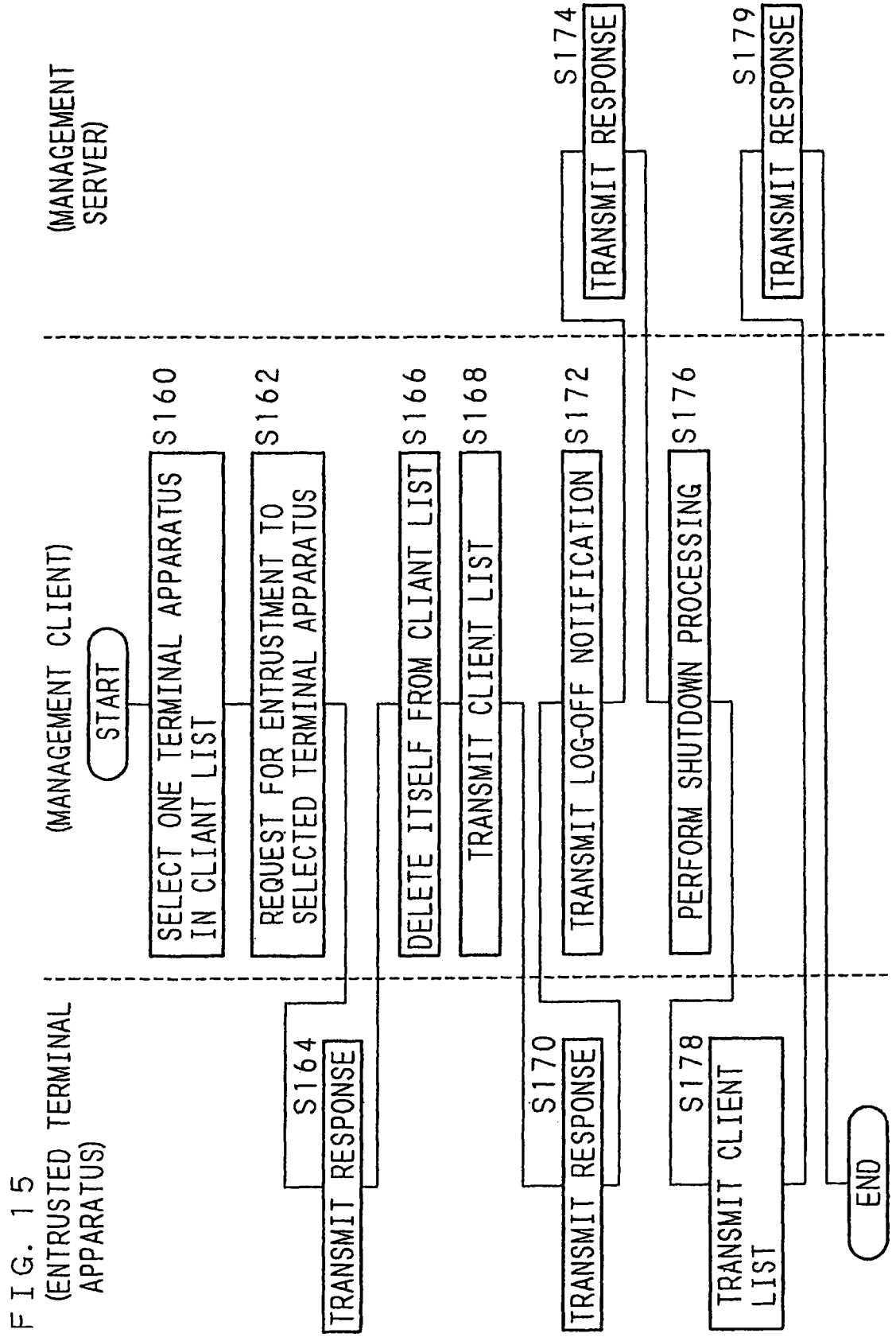

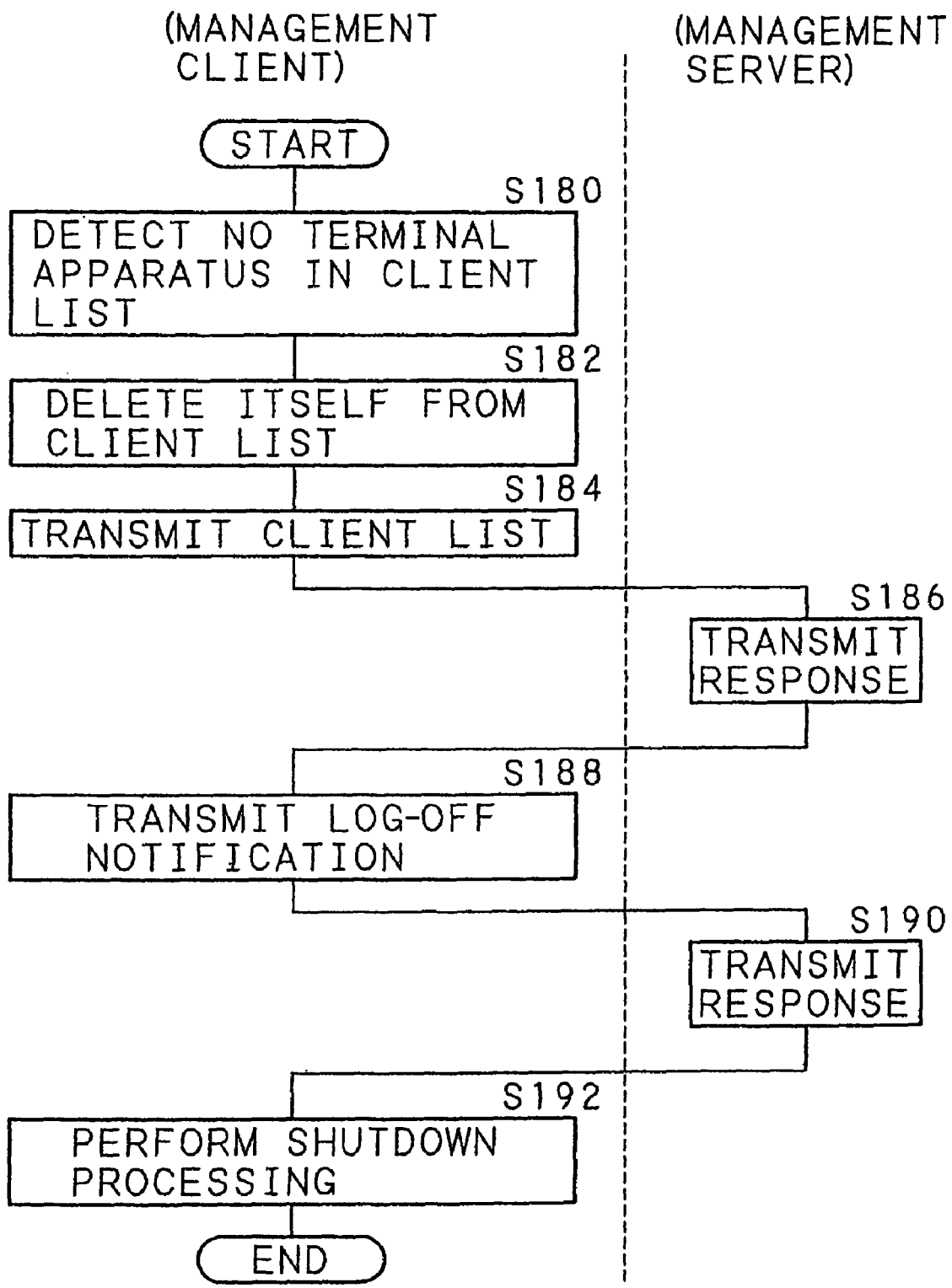

IDENTIFICATION INFORMATION CREATING METHOD, INFORMATION PROCESSING APPARATUS, COMPUTER PROGRAM PRODUCT, RECORDING DEVICE MONITORING METHOD, TERMINAL APPARATUS MANAGEMENT METHOD, AND COMMUNICATION NETWORK SYSTEM

This is a Divisional Application of Ser. No. 10/737,882, filed Dec. 18, 2003, now U.S. Pat. No. 7,447,752 claiming foreign priority benefit of JP 2002-374596, filed Dec. 25, 2002, the disclosures of which are incorporated herein by reference.

BACKGROUND OF THE INVENTION

1. Field of the Invention

The present invention generally relates to the management of terminal apparatuses of a communication network. More particular, the present invention relates to an identification information creating method for identifying the terminal apparatuses, a communication network system, an information processing apparatus and a computer program product therefor; moreover, to a recording device monitoring method for monitoring attaching or detaching of a recording device to or from the terminal apparatuses, an information processing apparatus and a computer program product therefor; and further, to a terminal apparatus management method for managing terminal apparatuses, a communication network system and a computer program product therefor.

2. Description of Related Art

In many communication network systems, a multiplicity of terminal apparatuses are connected to a central apparatus such as a file server or a database server, and necessary data can be downloaded by accessing, for example, the file server from the terminal apparatuses. Many communication network systems prevent accesses from unauthorized users by performing authentication using passwords and the like. However, in recent years, in order to prevent information leakage, it has been performed to restrict the accessible data on an apparatus-by-apparatus basis. For example, access restriction suitable for each terminal apparatus can be placed by identifying each terminal apparatus with use of the IP address assigned to each terminal apparatus or by identifying each terminal apparatus with use of the MAC address assigned to the LAN board of each terminal apparatus (see, for example, Japanese Patent Application Laid-Open No. 2000-187646).

However, since the setting of IP addresses can be easily changed by software, it is impossible to uniquely identify terminal apparatuses by IP addresses. Moreover, since LAN boards can be easily changed, it is also impossible to uniquely identify terminal apparatuses by LAN boards. Particularly, in the case of notebook-sized personal computers, extended cards (LAN cards) such as IC cards are frequently changed. For these reasons, it is possible to spoof as an authorized terminal apparatus by changing the setting of the IP address or changing the LAN card.

Moreover, in recent years, the range of use of stamp-sized recording media of approximately 10 to 100 M bytes using flash memories has been increasing. For example, a recording medium as mentioned above is inserted into a predetermined slot of a booted computer, the computer automatically recognizes the recording medium, and the recording medium can be used like a hard disk. Such easily attached and detached recording media increase the fear of information leakage.

As a method for managing a change (attaching or detaching) of a recording device such as the above-mentioned recording medium in terminal apparatuses, a method is considered such that a management server is provided in the communication network system and the management server inquires of each terminal apparatus the presence or absence of a change of a recording device. However, when the management server makes an inquiry to each terminal apparatus, the traffic of the network increases. Moreover, when the number of terminal apparatuses is large, the period of inquiry to each terminal apparatus increases, so that it is difficult to instantly detect a change of a recording device of each terminal apparatus. Further, it is necessary to preregister the terminal apparatuses to be managed in the management server.

BRIEF SUMMARY OF THE INVENTION

The present invention is made in view of the above-mentioned circumstances, and an object thereof is to provide an identification information creating method capable of preventing spoofing as an authorized terminal apparatus, a communication network system, an information processing apparatus and a computer program product therefor.

Another object of the present invention is to provide a recording device monitoring method capable of monitoring attaching or detaching of a recording device on the side of the terminal apparatus, an information processing apparatus and a computer program product therefor.

Yet another object of the present invention is to provide a terminal apparatus management method capable of reducing the traffic of the communication network needed for managing the terminal apparatuses, a communication network system and a computer program product therefor.

A first aspect of the invention is invention for creating identification information of terminal apparatuses, and includes invention of an identification information creating method, a communication network system, an information processing apparatus and a computer program product.

An identification information creating method according to the first aspect is the invention for creating identification information of an information processing apparatus which is connected to a communication network, and is assigned unique address information in the communication network, and unique hardware identification information to hardware and unique software identification information to software, characterized by comprising steps of generating an identification value from the software identification information by the information processing apparatus based on a predetermined generation algorithm; and creating identification information of the information processing apparatus from the address information and/or the hardware information and the identification value by the information processing apparatus based on a predetermined creation algorithm.

A communication network system according to the first aspect is the invention for a network system including: a plurality of terminal apparatuses each of which is connected to a communication network, and is assigned unique address information in the communication network, umque hardware identification information to hardware and unique software identification information to software; and a central apparatus connected to each of the terminal apparatuses, characterized in that each of the terminal apparatuses comprises: generating means for generating an identification value from its own software identification information based on a predetermined generation algorithm; creating means for creating its own identification information from its own address information and/or hardware identification information and the identification value generated by the generating means based on a predetermined creation algorithm; and means for transmitting the identification information created by the creating means to the central apparatus.

Moreover, a communication network system according to the first aspect is the invention, in the above mentioned invention, characterized in that the central apparatus comprises: obtaining means for obtaining an identification information list in which the identification information of the plurality of terminal apparatuses is preregistered; detecting means for detecting a match or a partial match between the identification information transmitted from any of the plurality of terminal apparatuses and the identification information of each terminal apparatus registered in the identification information list; and adding means for adding the identification information transmitted from the terminal apparatus to the identification information list when the detecting means detects neither a match nor a partial match.

An information processing apparatus according to the first aspect is the invention for an information processing apparatus which is connected to a communication network, and is assigned unique address information in the communication network, unique hardware identification information to hardware and unique software identification information to software, characterized by comprising: generating means for generating an identification value from the software identification information based on a predetermined generation algorithm; and creating means for creating its own identification information from the address information and/or the hardware identification information and the identification value based on a predetermined creation algorithm.

Moreover, an information processing apparatus according to the first aspect is the invention for an information processing apparatus being connected to a communication network, and accepting identification information of an apparatus to which unique address information in the communication network, unique hardware identification information to hardware and unique software identification information to software are assigned, from the apparatus, characterized in that the identification information of the apparatus is created from the address information and/or hardware identification information of the apparatus and an identification value generated from the software identification information of the apparatus, and the information processing apparatus comprises: obtaining means for obtaining an identification information list in which identification information of a plurality of apparatuses is preregistered; detecting means for detecting a match or a partial match between the accepted identification information and the identification information registered in the identification information list; and adding means for adding the accepted identification information of the apparatus to the identification information list when the detecting means detects neither a match nor a partial match.

A computer program product according to the first aspect is the invention for a computer program product comprising a computer usable storage medium having a computer readable program code embodied therein for creating its own identification information, the computer being connected to a communication network, and being assigned unique address information in the communication network, unique hardware identification information to hardware and unique software identification information to software, characterized in that the computer readable program code comprises: causing a computer to generate an identification value from its own software identification information based on a predetermined generation algorithm; and causing a computer to create it own identification information from its own address information and/or hardware identification information and the generated identification value based on a predetermined creation algorithm.

A second aspect of the invention is invention for monitoring recording device, and includes invention of a recording device monitoring method, an information processing apparatus and a computer program product.

A recording device monitoring method according to the second aspect is the invention for monitoring attaching or detaching of a recording device to or from an information processing apparatus which has an information storage unit storing information, and creates recording device information relating to an accessible recording device by detecting attaching or detaching of a recording device, characterized by comprising steps of storing already created recording device information into the information storage unit by the information processing apparatus when the information processing apparatus executes processing for shutdown or reboot; determining by the information processing apparatus whether or not recording device information created at the time of booting and the recording device information stored in the information storage unit match with each other when the information processing apparatus is booted; and updating the recording device information stored in the information storage unit by the information processing apparatus when it is determined that the pieces of information do not match with each other.

An information processing apparatus according to the second aspect is the invention for an information processing apparatus which creates recording device information relating to an accessible recording device by detecting attaching or detaching of a recording device, characterized by comprising: an information storage unit storing already created recording device information when processing for shutdown or reboot is executed; determining means for determining whether or not recording device information created at the time of booting and the recording device information stored in the information storage unit match with each other at the time of booting; and updating means for updating the recording device information stored in the information storage unit when the determining means determines that the pieces of information do not match with each other.

Moreover, an information processing apparatus according to the second aspect is the invention, in the above mentioned invention, characterized in that the updating means updates the recording device information stored in the information storage unit when a recording device is attached or detached during a period from booting until starting processing for shutdown or reboot.

A computer program product according to the second aspect is the invention for a computer program product comprising a computer usable storage medium having a computer readable program code embodied therein for monitoring attaching or detaching of a recording device to or from itself the computer creating recording device information relating to an accessible recording device by detecting attaching or detaching of a recording device, characterized in that the computer readable program code comprises: causing a computer to store already created recording device information at the time of executing processing for shutdown or reboot; causing a computer to determine whether or not recording device information created at the time of booting and the stored recording device information match with each other when being booted; and causing a computer to update the stored recording device information when it is determined that the pieces of information do not match with each other.

A third aspect of the invention is invention for segmented networks, and includes invention of a terminal apparatus management method, a communication network system and a computer program product.

A terminal apparatus management method according to the third aspect is the invention for a method of a communication network system including: a plurality of network segments to each of which at least one terminal apparatus is connected; and a central apparatus connected to the plurality of network segments, characterized by comprising steps of: creating, in each network segment, management information of a terminal apparatus having been booted by another booted terminal apparatus in the same network segment; and transmitting the management information created by the another terminal apparatus from the another terminal apparatus to the central apparatus.

Moreover, a terminal apparatus management method according to the third aspect is the invention for a method of a communication network system including: a plurality of network segments to each of which at least one terminal apparatus is connected; and a central apparatus connected to the plurality of network segments, characterized by comprising steps of requiring, in each network segment, a response from a terminal apparatus being booted to another terminal apparatus in the same network segment; creating management information of terminal apparatuses including itself having been booted in the same network segment by the terminal apparatus being booted when there is not a response from another terminal apparatus; and transmitting the management information created by the terminal apparatus being booted from the same to the central apparatus.

A communication network system according to the third aspect is the invention for a communication network system including: a plurality of terminal apparatuses connected to any of a plurality of network segments; and a central apparatus connected to the plurality of network segments, characterized in that each of the terminal apparatuses comprises: communicating means for requesting a response from another terminal apparatus in the network segment at the time of booting; and creating means for creating management information of terminal apparatuses including itself having been booted in the same network segment when there is not a response from another terminal apparatus, and transmits the management information created by the creating means from the communicating means to the central apparatus.

Moreover, a communication network system according to the third aspect of the invention, in the above mentioned invention, characterized in that each of the terminal apparatuses further comprises updating means for updating the management information when the communicating means accepts a request for a response from another terminal apparatus in the same network segment after the management information is created by the creating means, transmits a response from the communicating means to the another terminal apparatus requesting a response, and transmits the management information updated by the updating means from the communicating means to the central apparatus.

Moreover, a communication network system according to the third aspect is the invention, in the above mentioned invention, characterized in that each of the terminal apparatuses transmits a request for a response from the communicating means to terminal apparatuses having been booted in the same network segment after the management information is created by the creating means, updates the management information by the updating means when there is a terminal apparatus that makes no response, and transmits the updated management information from the communicating means to the central apparatus.

Moreover, a communication network system according to the third aspect is the invention, in the above mentioned invention, characterized in that each of the terminal apparatuses further comprises: obtaining means for obtaining connection information relating to terminal apparatuses having been booted in the same network segment; and difference detecting means for detecting a difference between the created management information and the connection information obtained by the obtaining means after the management information is created by the creating means, transmits a request for a response from the communicating means to the terminal apparatus where the difference is detected, and transmits a notification of the presence of the terminal apparatus where the difference is detected from the communicating means to the central apparatus when a response is accepted by the communicating means.

Moreover, a communication network system according to the third aspect is the invention, in the above mentioned invention, characterized in that each of the terminal apparatuses updates the management information by the updating means when a notification of shutdown of a terminal apparatus having been booted in the same network segment is accepted by the communicating means after the management information is created by the creating means, and transmits the updated management information from the communicating means to the central apparatus.

Moreover, a communication network system according to the third aspect is the invention, in the above mentioned invention, characterized in that, each of the terminal apparatuses, when being shut down after creating the management information by the creating means, updates the management information by the updating means, and transmits the updated management information from the communicating means to another booted terminal apparatus in the same network segment.

A computer program product according to the third aspect is the invention for a computer program product comprising a computer usable storage medium having a computer readable program code embodied therein for causing a computer being connected to any of a plurality of network segments to create management information relating to the network segment to which the computer is connected, characterized in that the computer readable program code comprises: causing a computer to request a response to another computer in the network segment to which itself is connected; and causing a computer to create, when there is no response, the management information of computers including itself having been booted in the network segment to which itself is connected.

In the invention for creating identification information according to the first aspect of the invention, an identification value of each terminal apparatus is generated from software identification information based on a predetermined generation algorithm. For example, it is possible to generate a hash value (identification value) from a sequence number (software identification information) of software based on a predetermined hash algorithm. Moreover, identification information of each terminal apparatus is created from address information and/or hardware identification information and the generated identification value based on a predetermined creation algorithm. For example, it is possible to create identification information of each terminal apparatus by arranging the IP address (address information), the MAC address of the LAN board (hardware identification information) and the hash value (identification value) in a predetermined order.

Even if the IP address of a terminal apparatus is changed or the LAN board is replaced, only a part of the identification information is changed, so that it is difficult to spoof as an authorized terminal apparatus. Moreover, it is difficult to identify the original sequence number from the hash value, and the sequence number of which software is used cannot be easily identified, so that it is further difficult to spoof as an authorized terminal apparatus.

In the invention for monitoring recording device according to the second aspect of the invention, when the terminal apparatus (computer) is shut down or rebooted, recording device information is stored into an information storage unit such as a hard disk. Recording device information is created when the terminal apparatus is booted, and it is determined whether or not the created recording device information and the recording device information stored in the information storage unit match with each other. When it is determined that these pieces of information do not match with each other, the recording device information stored in the information storage unit is updated. Moreover, when a change (attaching or detaching) of a recording device is detected during the period from booting to shutdown or rebooting of the terminal apparatus, the recording device information stored in the information storage unit is updated. When a change of a recording device is detected, it is possible to perform processing relating to the prevention of information leakage or the like for example, by notifying a management server or the like of the detection.

In the invention for segmented networks according to the third aspect of the invention, a terminal apparatus (computer) being booted requests a response to another terminal apparatus in the same network segment. When there is not a response from another terminal apparatus, the terminal apparatus having been booted creates management information of terminal apparatuses including itself having been booted in the same network segment, and transmits the updated management information to the central apparatus. When accepting a request for a response from another terminal apparatus in the same network segment, the terminal apparatus having created the management information updates the management information, and transmits the updated management information to the central apparatus. Moreover, when detecting an increase or a reduction in the number of other terminal apparatuses having been booted in the same network segment, the terminal apparatus having created the management information also updates the management information, and transmits the updated management information to the central apparatus. The management of the terminal apparatuses in the same network segment is performed by the terminal apparatus having created the management information, and the management information is transmitted from this terminal apparatus to the central apparatus. The management information on the terminal apparatuses in the same network segment is created by any of the terminal apparatuses in the network segment, and the management information is transmitted from this terminal apparatus to the central apparatus.

The above and further objects and features of the invention will more fully be apparent from the following detailed description with accompanying drawings.

BRIEF DESCRIPTION OF THE SEVERAL VIEWS OF THE DRAWINGS

FIG. 14 is a flowchart showing an example of a shutdown procedure of the terminal apparatuses;

FIG. 15 is a part of flowchart showing an example of a shutdown procedure of a management client; and FIG. 16 is a part of flowchart showing an example of a shutdown procedure of a management client.

DETAILED DESCRIPTION OF THE PREFERRED EMBODIMENTS

Hereinafter, the present invention will be concretely described with reference to the drawings showing preferred embodiments thereof.

First Embodiment

Figure 1:
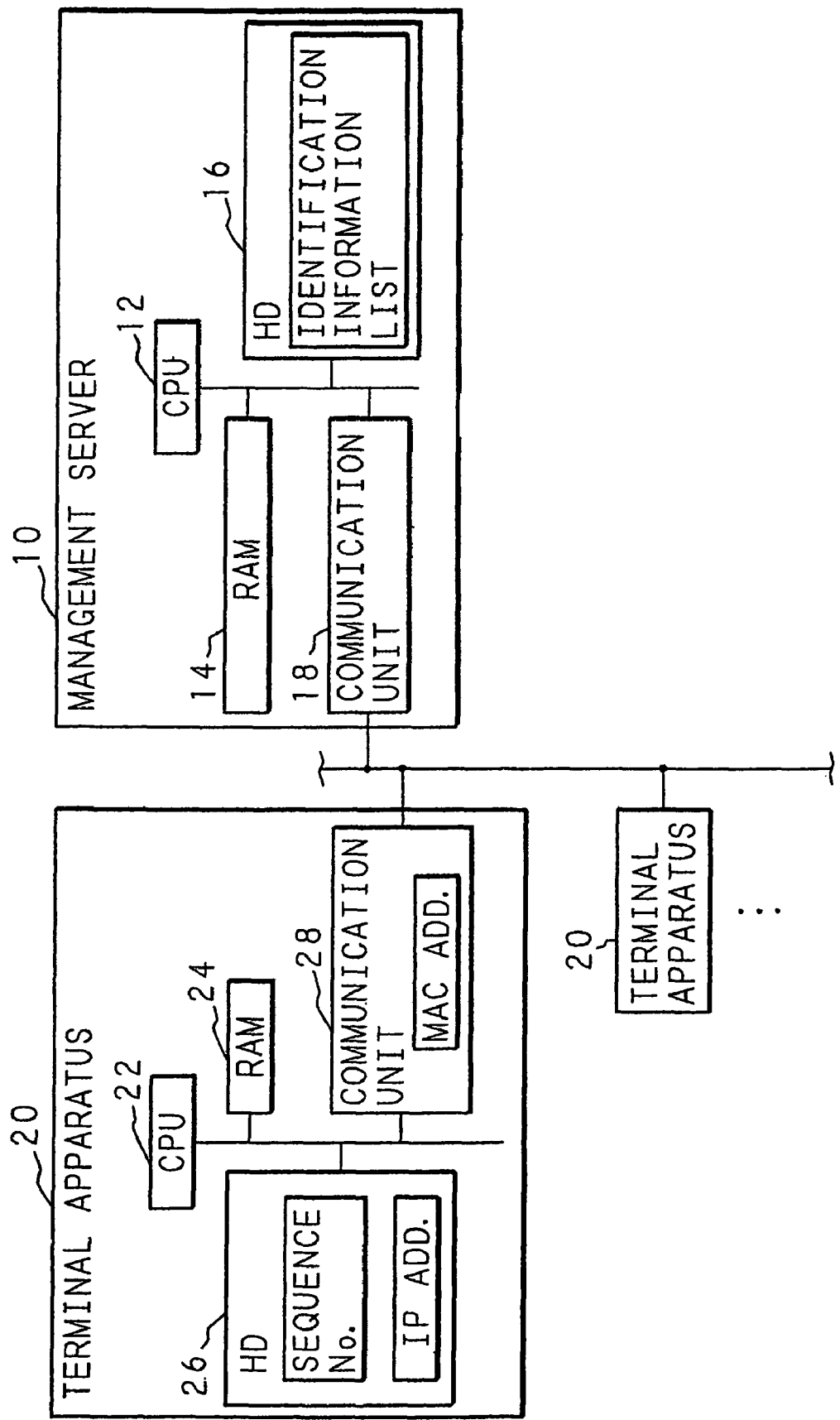
FIG. 1 is a block diagram showing an example of a communication network to which information processing apparatuses (terminal apparatuses, a management server) according to the present invention are connected.

FIG. 1 is a block diagram showing an example of a communication network to which information processing apparatuses according to the present invention are connected. To the communication network, a plurality of terminal apparatuses (information processing apparatuses) 20 creating identification information, and a management server (information processing apparatus) 10 accepting the identification information are connected. The management server 10 is provided with: a hard disk (HD) 16 storing programs and data; a RAM (random access memory) 14 temporarily storing programs and data; a CPU (central processing unit) 12 executing programs and performing data processing; and a communication unit 18 performing communication with the terminal apparatuses 20. Moreover, although not shown, the management server 10 may be provided with an input device such as a mouse or a keyboard, an output device such as a display or a printer, and an external storage device such as a CD-ROM (compact disk-read-only memory) drive, an MO (magneto-optical) disk drive or a DVD (digital versatile disk) drive.

The terminal apparatuses 20 are each provided with, like the management server 10, a CPU 22, a RAM 24, a hard disk (HD) 26 and a communication unit 28. Moreover, although not shown, it may be provided with an input device, an output device and an external storage device. To each terminal apparatus 20, address information such as an IP address unique in the communication network, hardware identification information such as a MAC address unique to the LAN board; and software identification information such as a sequence number unique to the OS (operating system) are assigned. The CPU 22 is capable of obtaining these pieces of information. The IP address and the sequence number are stored, for example, in the hard disk 26 of each terminal apparatus 20. The MAC address is stored, for example, in a ROM (read-only memory) in the communication unit 28 of each terminal apparatus 20.

The CPU 22 of each terminal apparatus 20 operates as means for generating an identification value from the sequence number based on a predetermined generation algorithm, and also means for creating identification information from the IP address and/or the MAC address and the generated identification value based on a predetermined creation algorithm. For example, the CPU 22 can generate a hash value (identification value) from the sequence number based on a hash algorithm. Moreover, the CPU 22 can create the identification information, for example, by arranging the IP address, the MAC address and the hash value in a predetermined order. Programs including the generation algorithm and the creation algorithm are stored in the hard disk 26. The identification information created in this manner is transmitted from the communication unit 28 to the management server 10.

The hard disk 16 of the management server 10 stores an identification information list in which a plurality of pieces of identification information are preregistered. The CPU 12 of the management server 10 operates as means for obtaining the identification information list, means for detecting a match or a partial match between the identification information transmitted from the terminal apparatus 10 and the identification information in the identification information list obtained from the hard disk 16, and also means for, when neither a match nor a partial match is detected, adding the identification information transmitted from the terminal apparatus 10 to the identification information list. The identification information list can also be obtained, for example, from another apparatus connected to the management server 10 through the communication unit 18. A partial match is determined based on a match of each of the IP address part, the MAC address part and the hash value part of the identification information.

The CPU 12 or 22 can be caused to operate as the above-described means by reading a computer program recorded on a recording medium such as a CD-ROM by an external storage device (not shown), storing it onto the hard disk 16 or 26 and causing the CPU 12 or 22 to execute it. Moreover, it is also possible to accept a computer program from another apparatus by the communication unit 18 or 28 and store it onto the hard disk 16 or 26.

Figure 2:
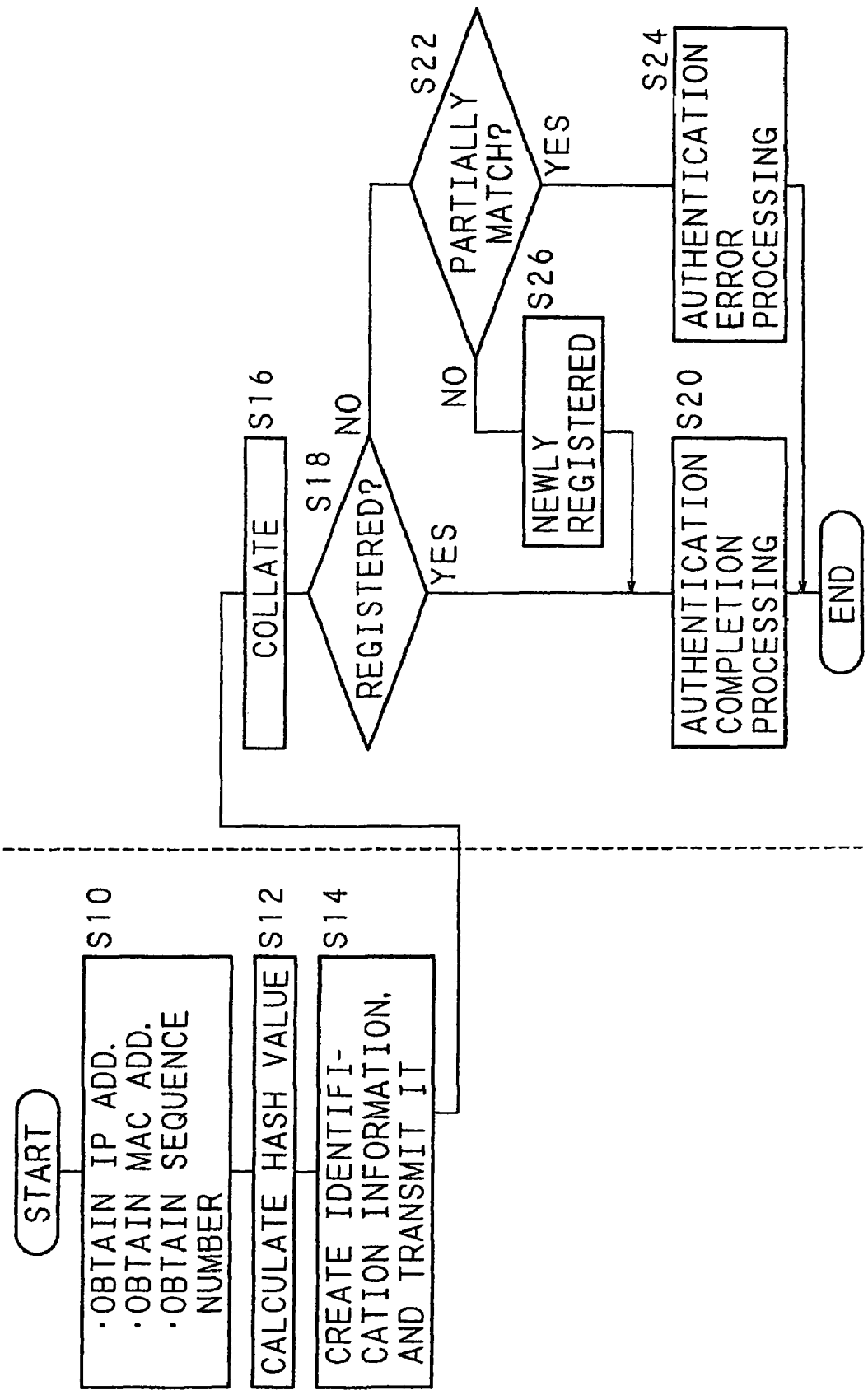
FIG. 2 is a flowchart showing an example of an authentication procedure of the terminal apparatuses.

FIG. 2 is a flowchart showing an example of an authentication procedure of the terminal apparatuses.

The CPU 22 of the terminal apparatus 20 obtains an IP address and a MAC address from the hard disk 26 and the communication unit 28 (S10) and stores them into the RAM 24, and obtains a sequence number from the hard disk 26 (S10) and stores it into the RAM 24. Then, the CPU 22 calculates the hash value of the sequence number stored in the RAM 24 based on a predetermined hash algorithm (S12) and stores it into the RAM 24. Moreover, the CPU 22 creates identification information from the IP address, the MAC address and the hash value which are stored in the RAM 24 based on a predetermined creation algorithm, stores the identification information into the RAM 24, and transmits the identification information stored in the RAM 24 to the management server 10 through the communication unit 28 (S14).

The CPU 12 of the management server 10 stores into the RAM 14 the authentication information that the communication unit 18 accepts from the terminal apparatus 20, and collates the identification information stored in the RAM 14 with the identification information list stored in the hard disk 16 (S16). When the identification information has already been registered in the identification information list (S18: YES), the CPU 12 performs authentication completion processing such as transmitting an authentication completion notification from the communication unit 18 to the terminal apparatus 20 (S20).

When the identification information is not registered in the identification information list (S18: NO), the CPU 12 performs partial match determination (S22). For example, when one or two of the IP address part, the MAC address part and the hash value part of the identification information match with those of the identification information in the identification information list, it is determined that the identification information partially matches. When it is determined that the identification information partially matches (S22: YES), since there is a possibility that one or two of the IP address, the MAC address and the hash value (sequence number) of the terminal apparatus 20 are falsified, the CPU 12 performs authentication error processing such as transmitting a warning message from the communication unit 18 to the temmal apparatus 20 (S24).

When it is not determined that the identification information partially matches (S22: NO), the CPU 12 newly registers the accepted identification information in the identification list (S26), and performs authentication completion processing (S20).

Second Embodiment

Figure 3:
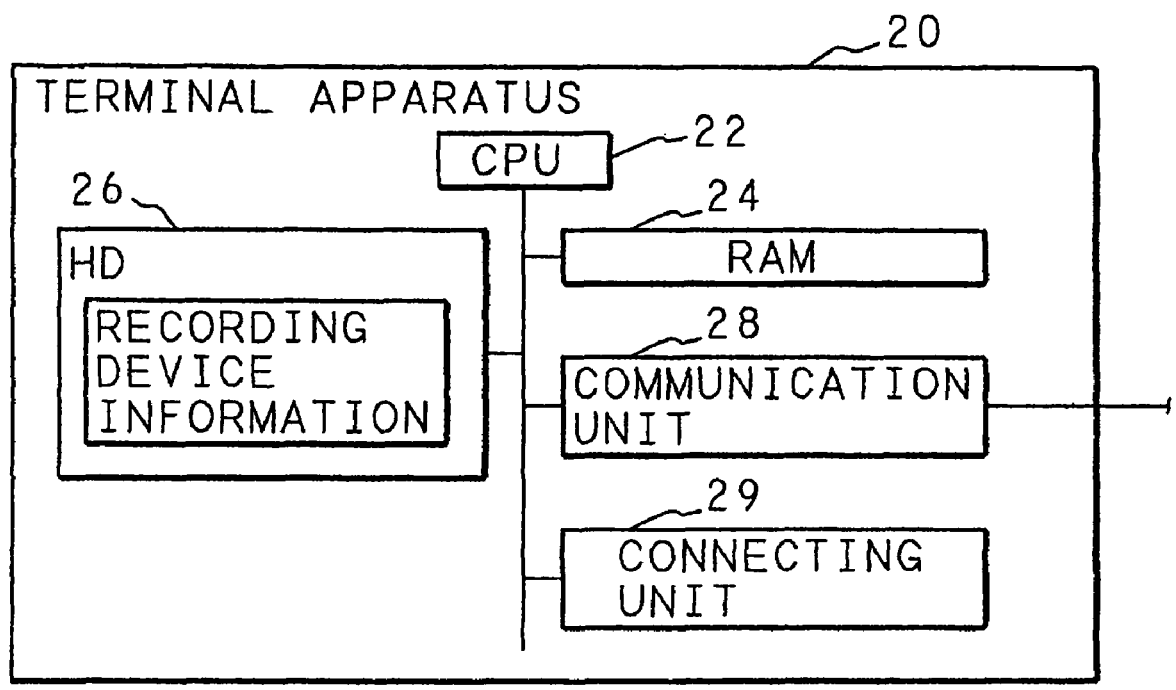
FIG. 3 is a block diagram showing an example of the information processing apparatus (terminal apparatus) according to the present invention.

FIG. 3 is a block diagram showing an example of the terminal apparatus (information processing apparatus) according to the present invention. The terminal apparatus 20 is provided with, like in the first embodiment, the CPU 22, the RAM 24, the hard disk 26 and the communication unit 28. Moreover, although not shown, it may be provided with an input device, an output device and an external storage device.

In the second embodiment, the terminal apparatus 20 has a connecting unit 29 to which a recording device capable of being attached and detached is connected. The CPU 22 detects attaching or detaching of a recording device to or from the connecting unit 29 and is capable of creating recording device information relating to accessible recording media. For example, the recording device information can be created by detecting attaching or detaching of a recording device by the CPU 22 with use of plug and play. The recording device is not limited to recording devices connected to the connecting unit 29 but includes, for example, recording devices shared via a network.

The terminal apparatus 20 stores the recording device information created by the CPU 22 into the hard disk (information storage unit) 26 every time it is shut down or rebooted. The CPU 22 operates, when the terminal apparatus 20 is booted, as means for determining whether or not the created recording device information matches with the recording device information stored in the hard disk 26, and also means for, when determining that the recording device information does not match, updating the recording device information stored in the hard disk 26. Moreover, the CPU 22 updates the recording device information stored in the hard disk 26 when a recording device is attached or detached during the period from booting to shutdown or rebooting.

The CPU 22 can be caused to operate as the above-described means by reading a computer program recorded on a recording medium such as a CD-ROM by an external storage device (not shown), storing it into the hard disk 26 and causing the CPU 22 to execute it. Moreover, it is also possible to accept a computer program from another apparatus by the communication unit 28 and store it onto the hard disk 26.

Figure 4:
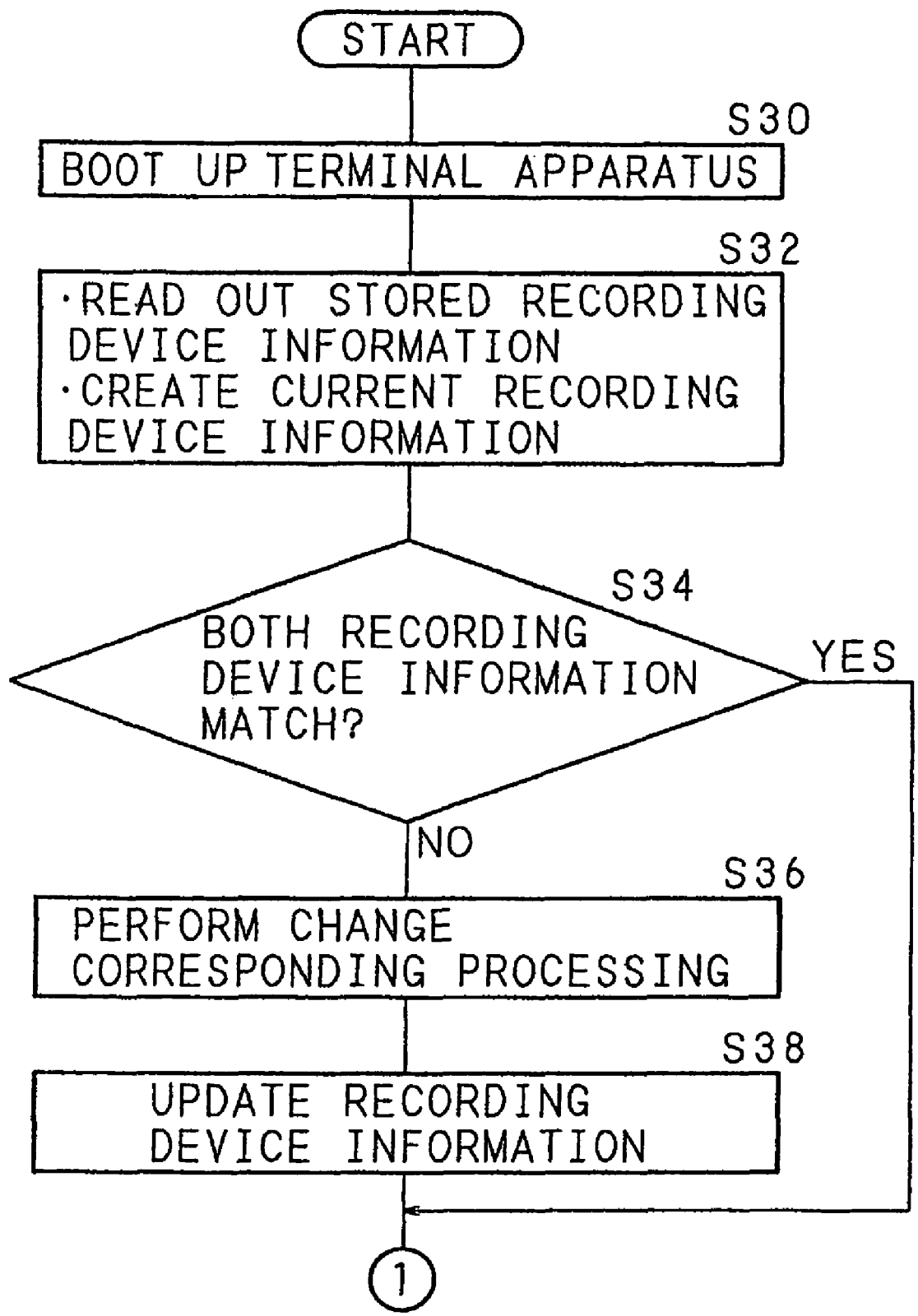
FIG. 4 is a part of flowchart showing an example of an update procedure of recording device information.
Figure 5:
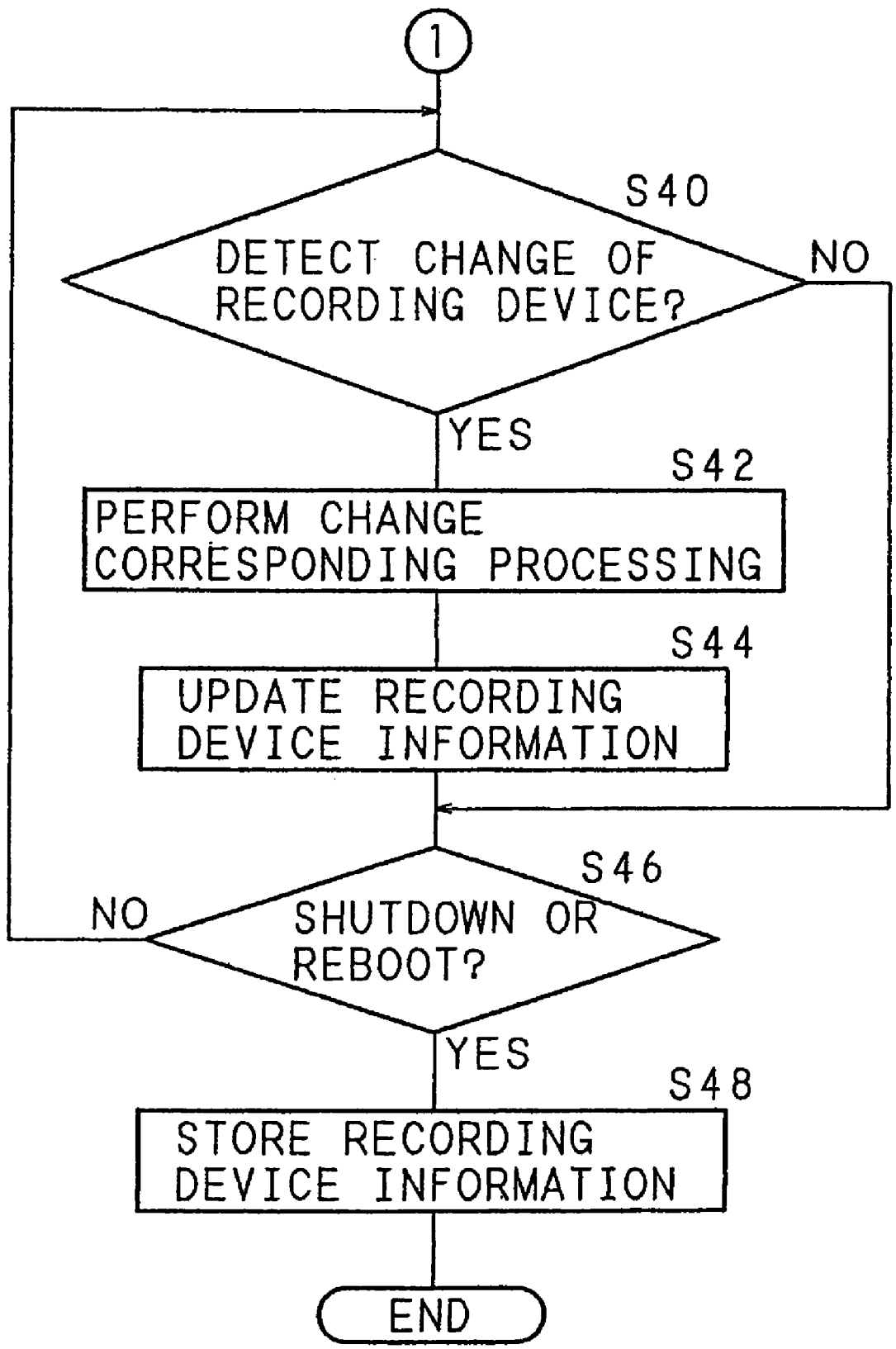
FIG. 5 is a part of flowchart showing an example of an update procedure of recording device information.

FIG. 4 and FIG. 5 are flowcharts showing an example of an update procedure of the recording device information.

Immediately after the terminal apparatus 20 boots up (S30), the CPU 22 reads out the recording device information stored in the hard disk 26 (S32) and stores it into the RAM 24, creates the current recording device information (S32) and stores it into the RAM 24, and compares these pieces of recording device information with each other. When these pieces of recording device information do not match with each other (S34: NO), determining that a recording device is attached or detached, the CPU 22 performs change corresponding processing such as displaying a warning message (S36), and updates the recording device information stored in the hard disk 26 (S38).

When the recording device information created at step S32 and the recording device information being read out match with each other (S34: YES) or after the recording device information in the hard disk 26 is updated (S38), the CPU 22 monitors attaching or detaching of the recording device. When a change (attaching or detaching) of the recording device is detected (S40: YES in FIG. 5), the CPU 12 performs change corresponding processing (S42), and updates the recording device information recorded in the hard disk 26 (S44).

When no change of a recording device is detected (S40: NO) or when the terminal apparatus 20 is shut down or rebooted (S46: YES) after the recording device information in the hard disk 26 is updated (S44), the CPU 12 stores the latest recording device information into the hard disk 26 (S48). When the terminal apparatus 20 is not shut down or rebooted (S46: NO), the CPU 12 monitors a change of a recording device.

While in the above-described example, the recording device information stored in the hard disk 26 is updated every time a change of a recording device is detected, the following processing, for example, may be performed: the recording device information is stored in the RAM 24, the recording device information stored in the RAM 24 is updated, and the recording device information stored in the RAM 24 is stored into the hard disk 26 at the time of shutdown or rebooting.

In the second embodiment, like in the first embodiment (see FIG. 1), if the terminal apparatus 20 is capable of communicating with the management server 10, when a change of a recording device is detected, the change corresponding processing can be performed, for example, on the side of the management server 10 by transmitting a recording device change detection notification from the communication unit 28 of the terminal apparatus 20 to the management server 10.

Third Embodiment

Figure 6:
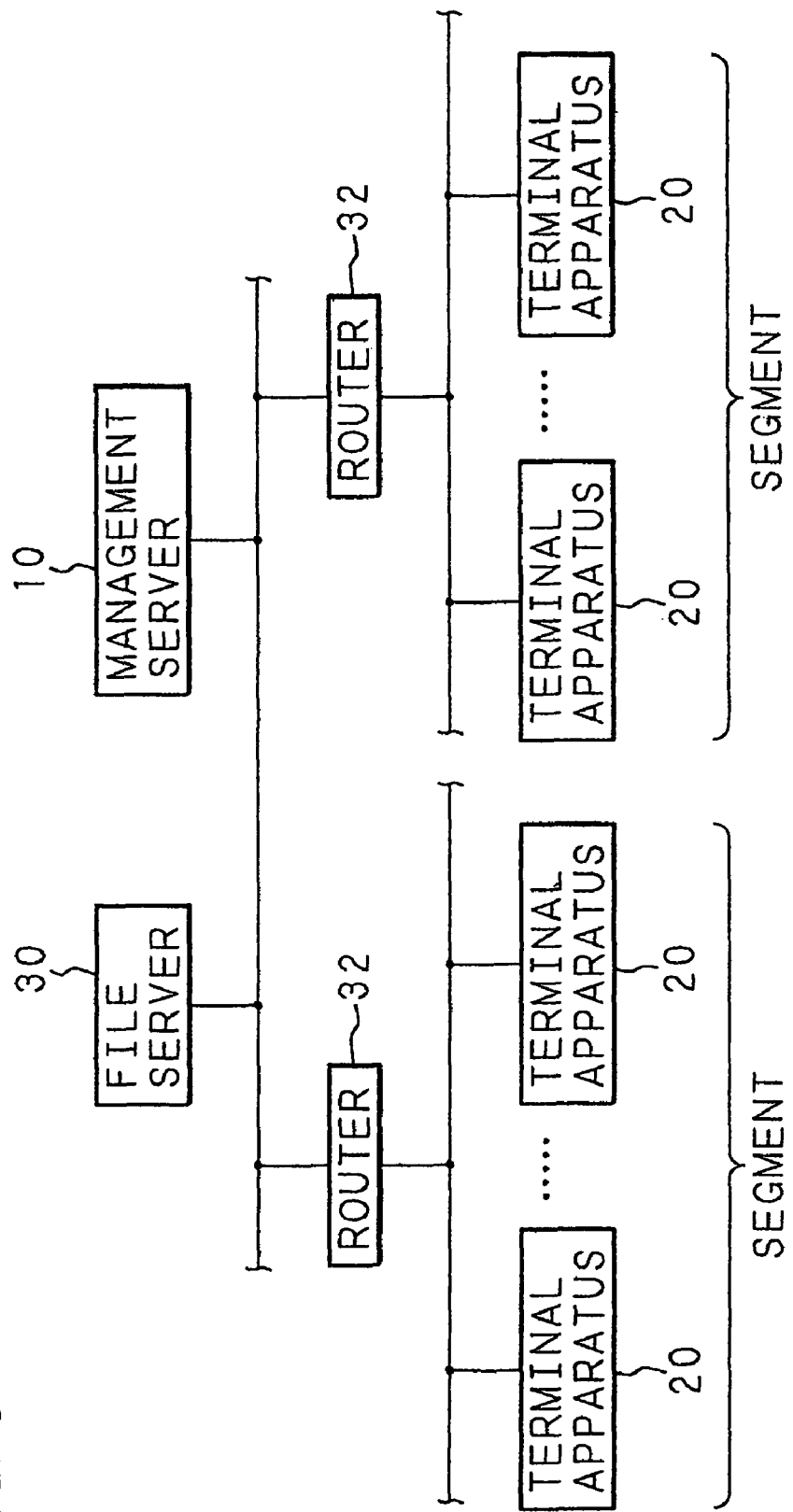
FIG. 6 is a block diagram showing an example of a communication network system according to the present invention.

FIG. 6 is a block diagram showing an example of a communication network system according to the present invention. The communication network system is provided with the terminal apparatuses 20, the management server 10, a file server 30 and a routers 32. The communication network is divided into plural network segments, and plural terminal apparatuses 20 are connected to each network segment. Each network segment, the management server 10 and the file server 30 are connected through the router 32.

Figure 7:
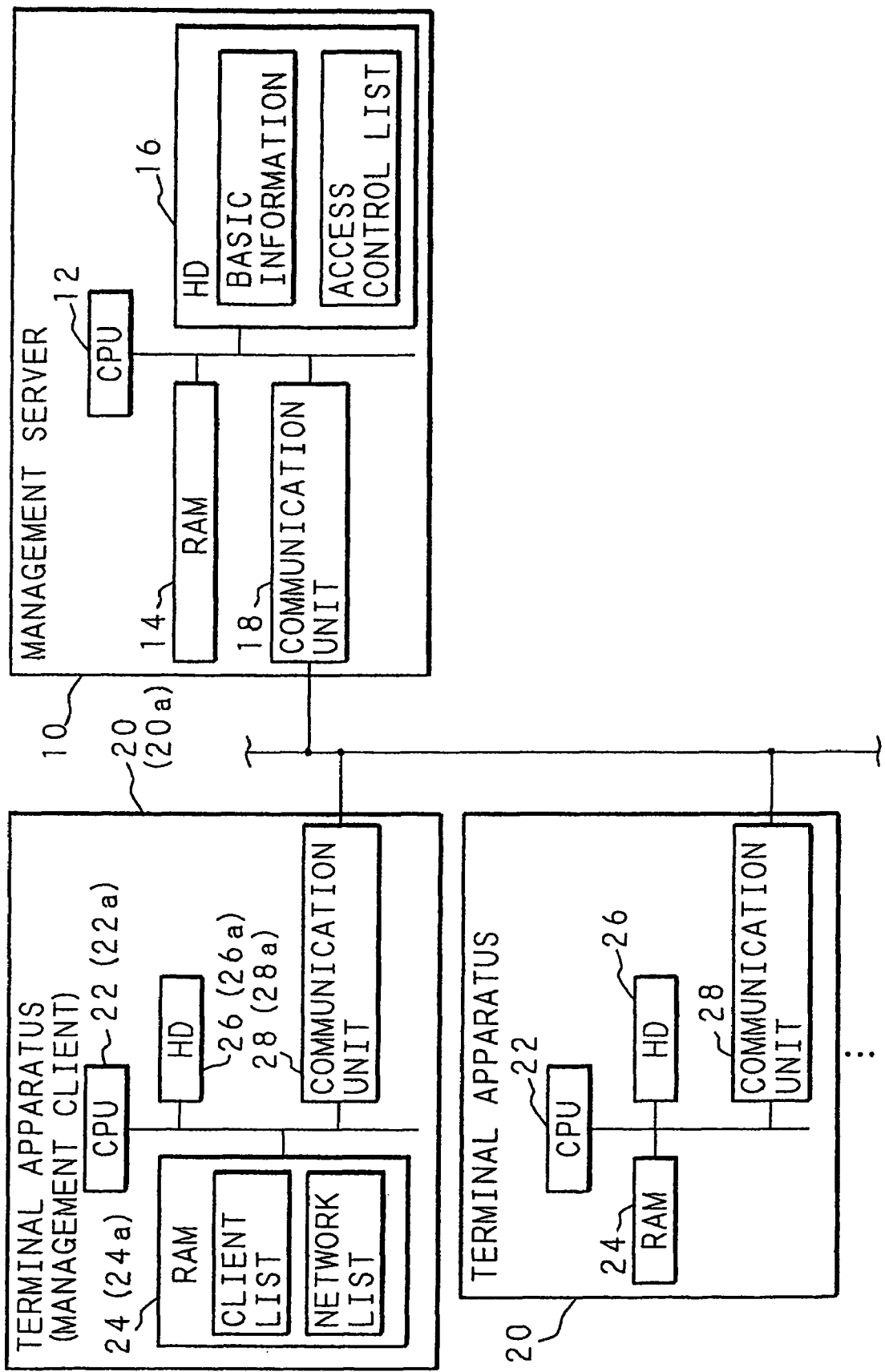
FIG. 7 is a block diagram showing an example of terminal apparatuses and a central apparatus according to the present invention.

FIG. 7 is a block diagram showing an example of the terminal apparatuses and the management server (central apparatus) according to the present invention. The management server 10 is provided with, like in the first embodiment, the CPU 12, the RAM 14, the hard disk 16 and the communication unit 18. Moreover, although not shown, it may be provided with an input device, an output device and an external storage device.

The hard disk 16 of the management server 10 stores basic information relating to the basic operation of each terminal apparatus 20 and an access control list relating to the restriction on the access to the file server 30.

The terminal apparatus 20 is provided with, like in the first embodiment, the CPU 22, the RAM 24, the hard disk 26 and the communication unit 28. Moreover, although not shown, it may be provided with an input device, an output device and an external storage device.

The communication unit 28 of each terminal apparatus 20 operates, when the terminal apparatus 20 is booted, as means for requesting a response to another terminal apparatus in the network segment. When there is not a response from another terminal apparatus, the CPU 22 operates as means for creating a client list (management information) of the booted terminal apparatuses including itself in the network segment, and transmits the created client list from the communication unit 28 to the management server 10. Moreover, the client list created by the CPU 22 is stored into the RAM 24. As the identification information of the terminal apparatuses in the client list, for example, the identification information described in the first embodiment may be used. Hereinafter, adding the identification information or the like of a terminal apparatus to the client list will be referred to as adding a terminal apparatus to the client list.

When the communication unit 28 accepts a request for a response from another terminal apparatus in the network segment after the client list is created, the CPU 22 of the terminal apparatus 20 operates as means for updating the client list. By updating the client list, when the terminal apparatus requesting a response is added, the CPU 22 transmits a response from the communication unit 28 to the terminal apparatus which requested a response, and transmits the updated management information from the communication unit 28 to the management server 10.

Moreover, after the client list is created, the CPU 22 of the terminal apparatus 20 transmits a request for a response from the communication unit 28 to other booted terminal apparatuses in the network segment based on the client list at predetermined time intervals. When there is a terminal apparatus that makes no response, the CPU 22 of the terminal apparatus 20 updates the client list to thereby delete the terminal apparatus making no response, and transmits the updated client list from the communication unit 28 to the management server 10.

Moreover, the CPU 22 of the terminal apparatus 20 operates as means for obtaining a network list relating to the booted terminal apparatuses in the network segment and also means for detecting the difference between the client list and the network list when the client list is created. Then, the CPU 22 of the terminal apparatus 20 transmits a request for a response from the communication unit 28 to the terminal apparatus where the difference is detected, and when the communication unit 28 accepts a response, the CPU 22 of the terminal apparatus 20 transmits a notification of the presence of the terminal apparatus where the difference is detected from the communication unit 28 to the management server 10. The network list is created, for example, by the OS, and the terminal apparatuses recognized by the OS are registered therein. The network list is stored in the RAM 24.

Moreover, when the communication unit 28 accepts a notification of shutdown of a booted terminal apparatus in the network segment after the client list is created, the CPU 22 of the terminal apparatus 20 updates the client list to thereby delete the terminal apparatus making the notification, and transmits the updated client list from the communication unit 28 to the management server 10.

Moreover, when the terminal apparatus 20 is shut down after the client list is created, the CPU 22 of the terminal apparatus 20 updates the client list to thereby delete itself and transmits the updated client list from the communication unit 28 to another booted terminal apparatus in the network segment. Hereinafter, the terminal apparatus 20 having the client list will be referred to as a management client 20a. The CPU, the RAM, the hard disk and the communication unit of the management client 20a will be designated 22a, 24a, 26a and 28a, respectively.

The CPU 22 can be caused to operate as the above-described means by reading a computer program recorded on a recording medium such as a CD-ROM by an external storage device (not shown), storing it into the hard disk 26 and causing the CPU 22 to execute it. Moreover, it is also possible to accept a computer program from another apparatus by the communication unit 28 and store it onto the hard disk 26.

Figure 8:
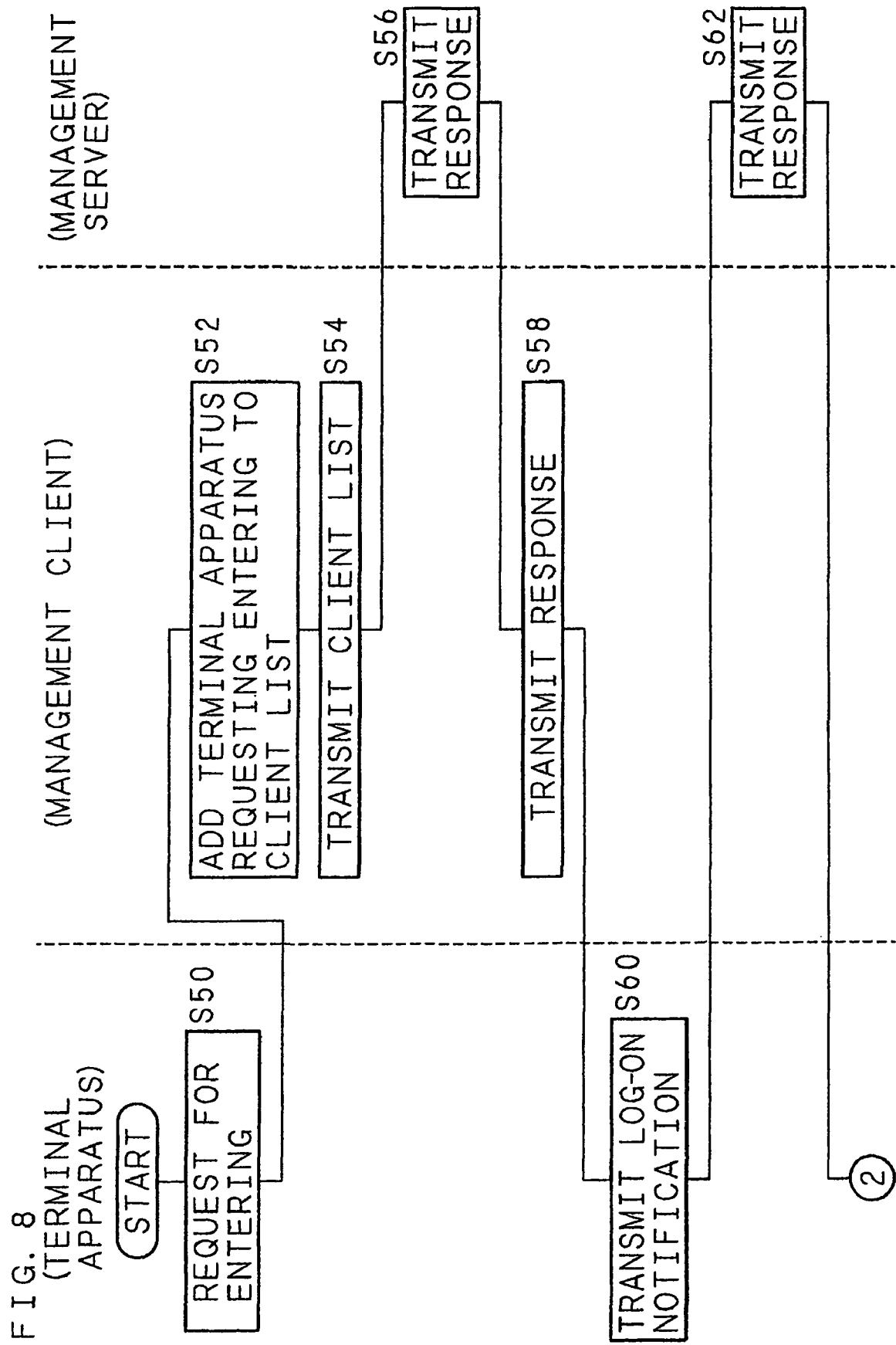
FIG. 8 is a part of flowchart showing an example of an entering procedure in the network.
Figure 9:
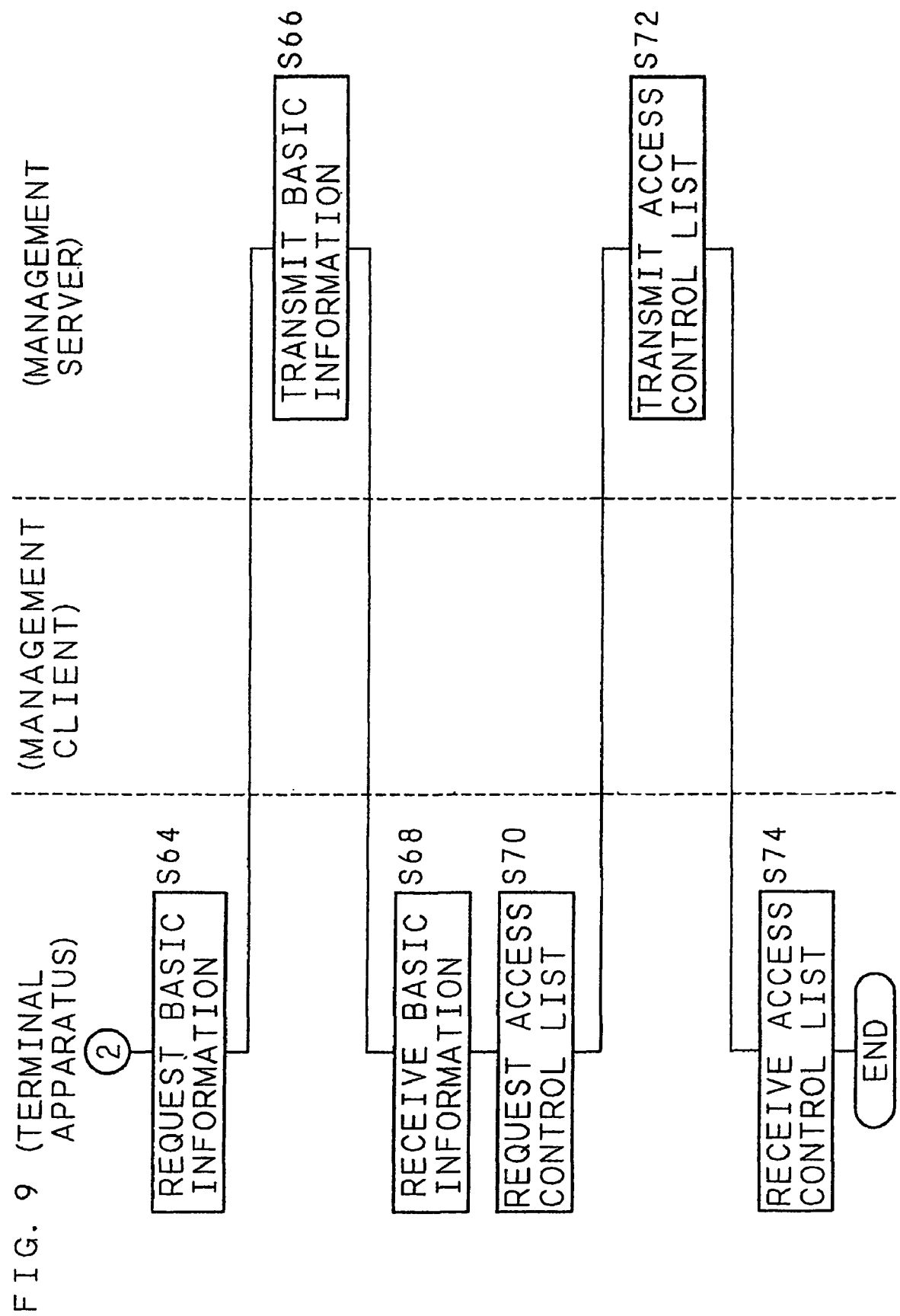
FIG. 9 is a part of flowchart showing an example of an entering procedure in the network.

FIG. 8 and FIG. 9 are flowcharts showing an example of an entering procedure of the terminal apparatuses 20 into the network when a management client 20a is present in the segment.

First, a request for entering is transmitted from the communication unit 28 of the booted terminal apparatus 20 into the network segment (S50). The management client 20a accepts the request for entering by the communication unit 28a, and the CPU 22a adds, for example, the identification information of the terminal apparatus 20 requesting entering to the client list stored in the RAM 24a (S52) and then, transmits the client list from the communication unit 28a to the management server 10 (S54). When accepting the client list by the communication unit 18, the management server 10 transmits a response from the communication unit 18 to the management client 20a (S56). When accepting the response from the management server 10 by the communication unit 28a, the management client 20a transmits a response to the request for entering from the communication unit 28a to the terminal apparatus 20 (S58)

The terminal apparatus 20 having accepted the response from the management client 20a by the communication unit 28 transmits a log-on notification from the communication unit 28 to the management server 10 (S60). When accepting a response to the log-on (S62) from the management server 10, the communication unit 28 of the terminal apparatus 20 requests basic information to the management server 10 and obtains it (S64, S66, S68 of FIG. 9), and requests an access control list to the management server 10 and obtains it (S70, S72, S74).

Figure 10:
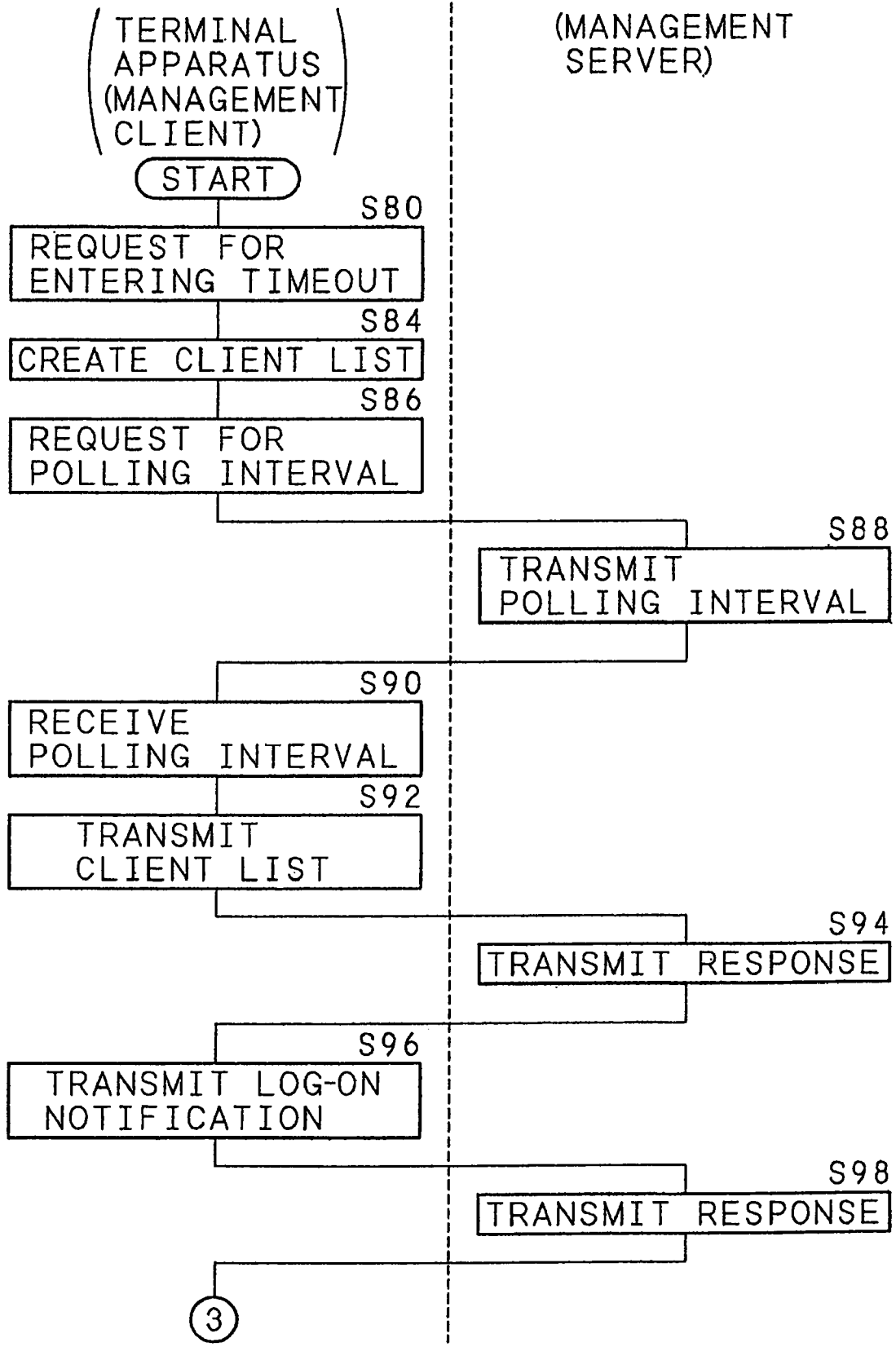
FIG. 10 is a part of flowchart showing an example of an entering procedure in the network.
Figure 11:
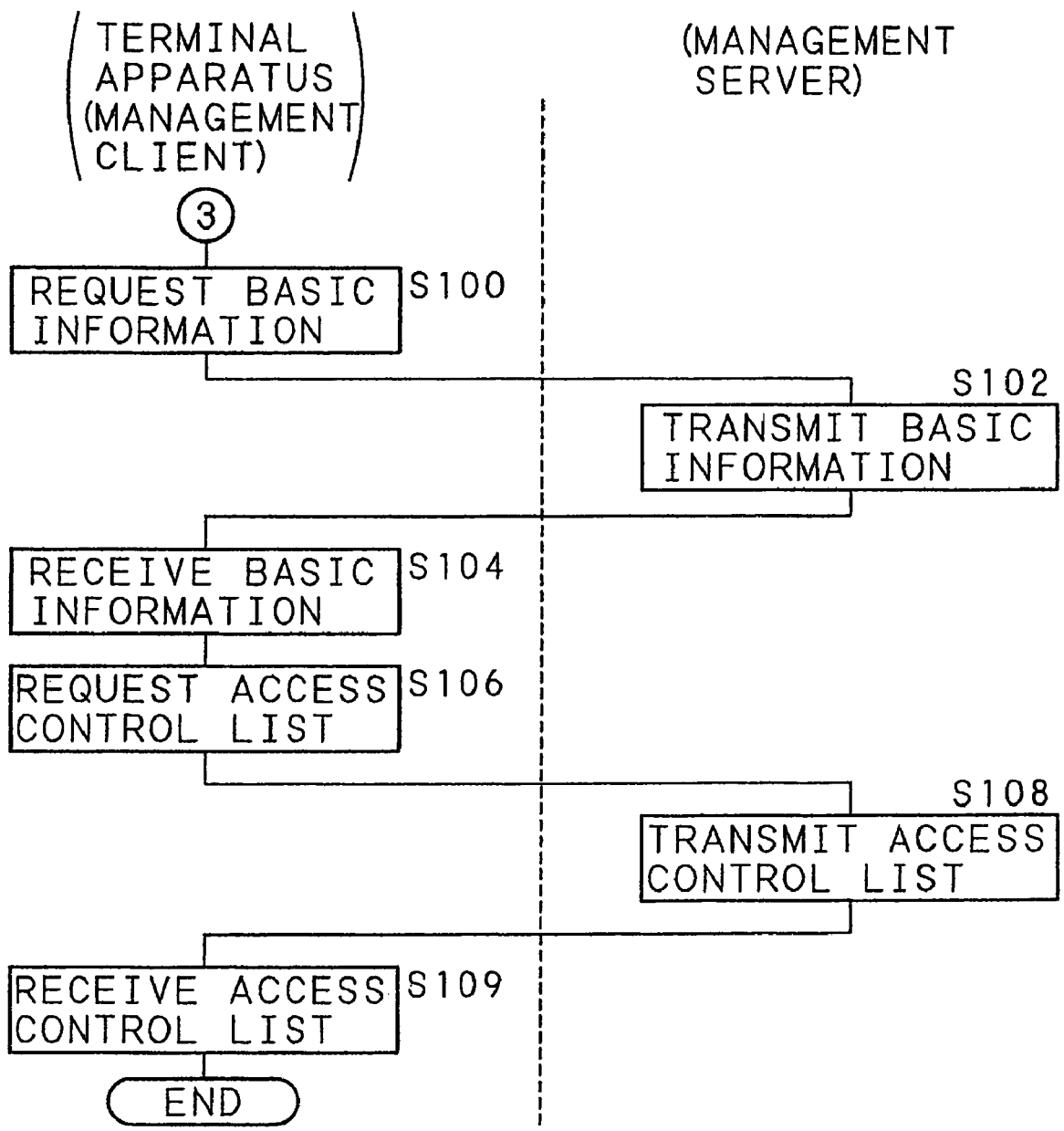
FIG. 11 is a part of flowchart showing an example of an entering procedure in the network.

FIG. 10 and FIG. 11 are flowcharts showing an example of an entering procedure of the terminal apparatus 20 in the network when there is no management client 20a in the segment.

The request for entering transmitted from the booted terminal apparatus 20 becomes timeout because no management client is present (S80). In this case, the booted terminal apparatus 20 itself functions as the management client 20a. The CPU 22a of the management client 20a creates a client list in which the management client 20a itself is registered (S84), and stores it into the RAM 24a. The CPU 22a of the management client 20a transmits a request for the polling interval from the communication unit 28a to the management server 10 (S86), receives the polling interval transmitted from the management server 10 (S88) by the communication unit 28a (S90), and then, transmits the client list from the communication unit 28a to the management server 10 (S92).

When accepting the client list by the communication unit 18, the management server 10 transmits a response from the communication unit 18 to the management client 20a (S94). When accepting the response from the management server 10 by the communication unit 28a, the management client 20a transmits a log-on notification to the management server 10 (S96). The management client 20a having accepted a response to the log-on transmitted from the management server 10 (S98) by the communication unit 28a transmits a request for basic information from the communication unit 28a to the management server 10 and obtains the basic information (S100, S102, S104 of FIG. 1), and requests an access control list to the management server 10 and obtains it (S106, S108, S109).

Figure 12:
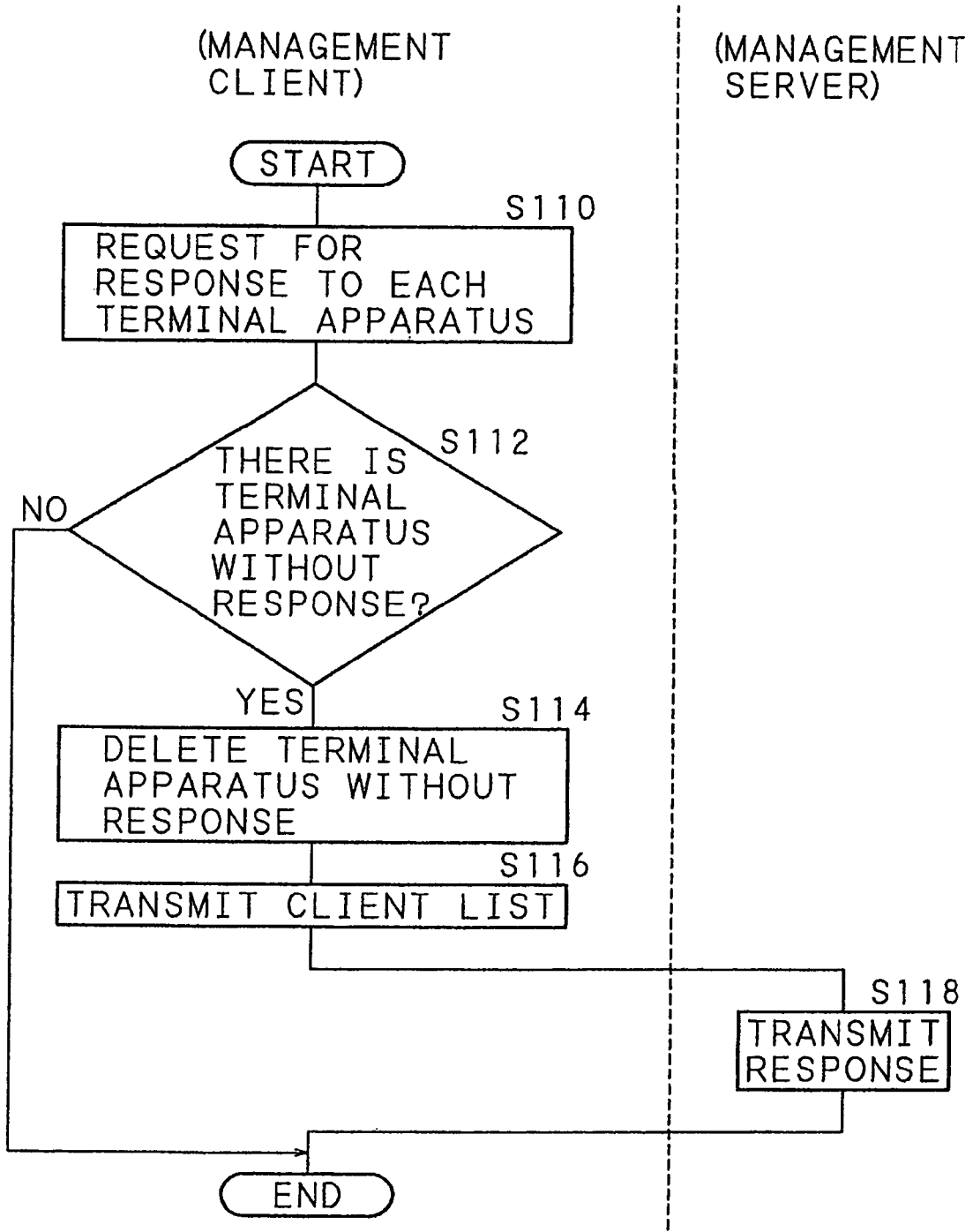
FIG. 12 is a flowchart showing an example of a management procedure of the terminal apparatuses.

FIG. 12 is a flowchart showing an example of a management procedure of the terminal apparatuses 20 in the segment by the management client 20a.

The CPU 22a of the management client 20a transmits a request for a response from the communication unit 28a to each terminal apparatus 20 in the segment based on the client list (S110). When there is a response from all the terminal apparatuses 20 (S112: NO), the processing is ended. When there is a terminal apparatus that makes no response (S112: YES), the CPU 22a deletes the terminal apparatus making no response from the client list (S114), transmits the client list from the communication unit 28a to the management server 10 (S116), and receives a response to the receipt of the client list (S118) from the management server 10. The processing shown in the flowchart of FIG. 12 is repeated by the CPU 22a of the management client 20a at predetermined time intervals, for example, at the polling intervals accepted from the management server 10.

While the terminal apparatus 20 making no response is deleted from the client list in the example shown in the flowchart in FIG. 12, it may be deleted from the client list, for example, when the condition where no response is made is repeated a plurality of times.

Figure 13:
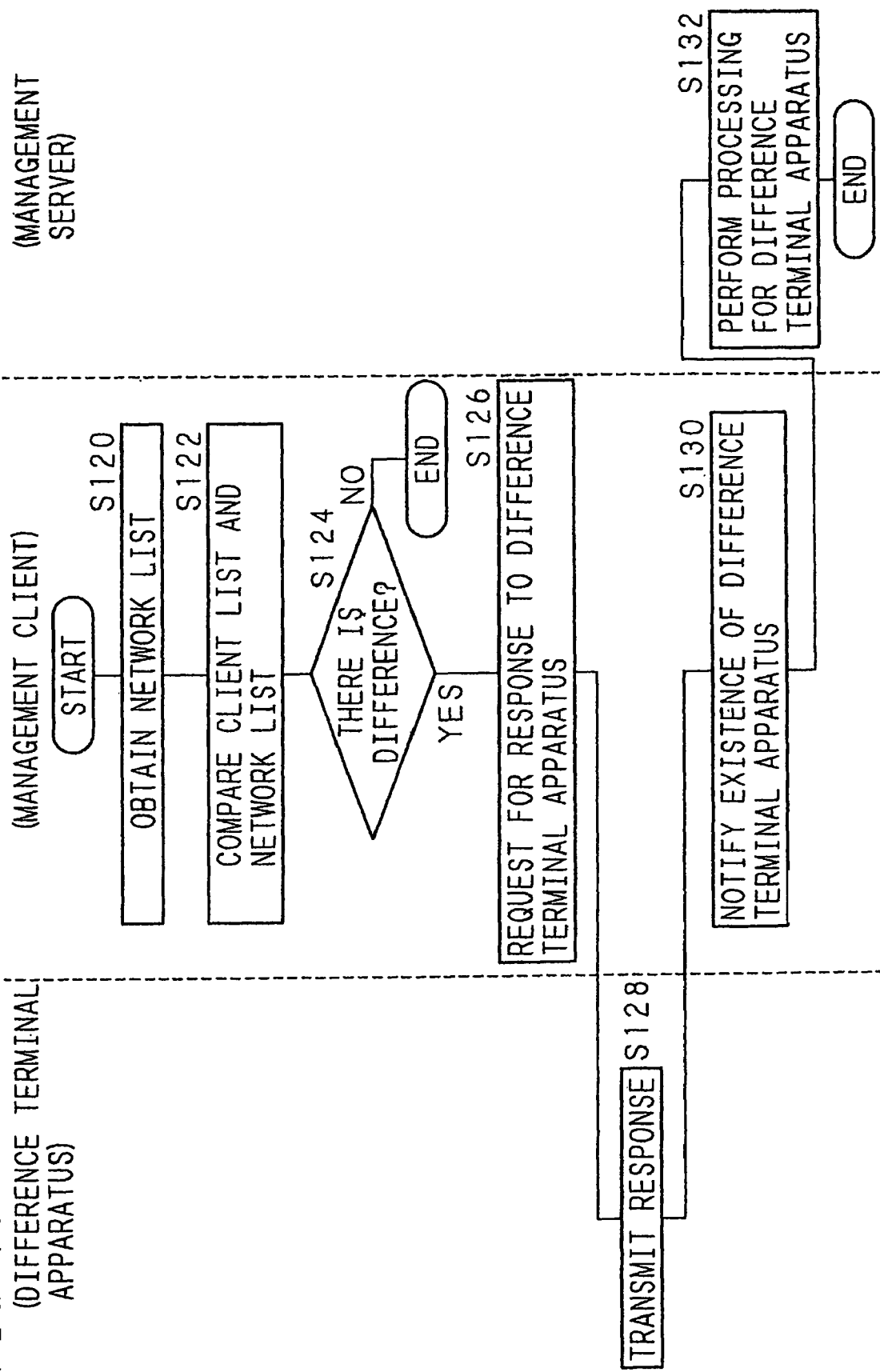
FIG. 13 is a flowchart showing an example of a management procedure of the terminal apparatuses.

FIG. 13 is a flowchart showing an example of a management procedure of the terminal apparatuses 20 in the segment by the management client 20a.

The CPU 22a of the management client 20a obtains the network list of the OS (S120), and compares the client list with the network list (S122). When there is no difference between these lists (S124: NO), the processing is ended. When there is a difference therebetween (S124: YES), the CPU 22a transmits a request for a response from the communication unit 28a to the terminal apparatus where the difference is detected (hereinafter, referred to as difference terminal apparatus) (S126). When accepting a response from the difference terminal apparatus (S128) by the communication unit 28a, the CPU 22a of the management client 20a transmits a notification of the presence of the difference terminal apparatus from the communication unit 28a to the management server 10 (S130). The management server 10 having accepted the notification from the management client 20a by the communication unit 18 performs processing for the difference terminal apparatus such as transmitting a warning to the difference terminal apparatus (S132). The processing shown in the flowchart of FIG. 13 is repeated at predetermined time intervals. The processings shown in the flowcharts of FIG. 12 and FIG. 13 are performed in parallel.

FIG. 14 is a flowchart showing an example of a shutdown procedure of the terminal apparatuses 20 when a management client 20a is present in the segment.

Each terminal apparatus 20 transmits a shutdown notification from the communication unit 28 to the management client 20a (S140). The management client 20a accepts the shutdown notification by the communication unit 28a, and the CPU 22a deletes the terminal apparatus 20 making the notification from the client list stored in the RAM 24 (S144), and then, transmits the client list from the communication unit 28a to the management server 10 (S144). When accepting the client list by the communication unit 18, the management server 10 transmits a response from the communication unit 18 to the management client 20a (S146). When accepting the response from the management server 10 by the communication unit 28a, the management client 20a transmits a response to the shutdown from the communication unit 28a to the terminal apparatus 20 (S148). The terminal apparatus 20 having accepted the response from the management client 20a by the communication unit 28 transmits a log-off notification from the communication unit 28 to the management server 10 (S150). The terminal apparatus 20 having accepted a response to the log-off transmitted from the management server 10 by the communication unit 28 (S152) performs shutdown processing (S154).

FIG. 15 is a flowchart showing an example of a shutdown procedure of the management client 20a when there is another terminal apparatus 20 in the segment.

The CPU 22a of the management client 20a selects one terminal apparatus in the client list (hereinafter, the selected terminal apparatus will be referred to as entrusted terminal apparatus) (S160), and transmits a request for entrustment from the communication unit 28a to the entrusted terminal apparatus (S162). In the management client 20a having accepted a response to the entrustment from the entrusted terminal apparatus (S164) by the communication unit 28a, the CPU 22 deletes the management client 20a itself from the client list stored in the RAM 24 (S166), and then, transmits the client list from the communication unit 28a to the entrusted terminal apparatus (S168). The management client 20a having accepted a response from the entrusted terminal apparatus (S170) by the communication unit 28a transmits a log-off notification from the communication unit 28a to the management server 10 (S172). The management client 20a having accepted a response to the log-off transmitted from the management server 10 (S174) by the communication unit 28a performs shutdown processing (S176). Moreover, the client list is transmitted from the entrusted terminal apparatus to the management server 10 (S178), and a response is transmitted from the management server 10 to the entrusted terminal apparatus (new management client) (S179).

FIG. 16 is a flowchart showing an example of a shutdown procedure of the management client 20a when there is no other terminal apparatus 20 in the segment.

When detecting that no terminal apparatus (entrusted terminal apparatus) is registered in the client list (S180), the CPU 22a of the management client 20a deletes the management client 22a itself from the client list stored in the RAM 24a (S182), and then, transmits the client list from the communication unit 28a to the management server 10 (S184). The management client 20a having accepted a response from the management server 10 (S186) by the communication unit 28a transmits a log-off notification from the communication unit 28a to the management server 10 (S188). The management client 20a having accepted a response to the log-off transmitted from the management server 10 (S190) by the communication unit 28a performs shutdown processing (S192).

As described above in detail, according to the first, the second, the third or the fourth aspect of the invention, by generating an identification value such as a hash value from software identification information such as a sequence number based on a predetermined generation algorithm, and creating identification information from address information, hardware identification information and the generated identification value based on a predetermined creation algorithm, spoofing as an authorized terminal apparatus can be prevented.

According to the fifth, the sixth or the seventh aspect of the invention, by storing recording device information in an information storage unit such as a hard disk when the terminal apparatus is shut down or rebooted, a change of a recording device can be detected immediately after booting. By performing processing associated with the prevention of information leakage when a recording device of the terminal apparatus is changed, information leakage can be prevented.

According to the eighth, the ninth or the tenth aspect of the invention, by dividing the communication network into a plurality of network segments, causing the terminal apparatus that is booted first in each network segment to manage the other terminal apparatuses in the same network segment and transmitting management information from the terminal apparatus that is booted first to the central apparatus, the traffic of the communication network needed for the management of the terminal apparatuses can be reduced. Moreover, since the terminal apparatuses in the same network segment are managed, the condition change of each terminal can be instantly detected. Further, since other terminal apparatuses being booted or shut down are added to or deleted from the management information, it is unnecessary to preregister the terminal apparatuses to be managed.

As this invention may be embodied in several forms without departing from the spirit of essential characteristics thereof the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A recording device monitoring method for monitoring attaching or detaching of a recording device to or from an information processing apparatus which has an information storage unit storing identification information identifying the recording device, comprising:
    creating first identification information of a first recording device connected to the information processing apparatus when the information processing apparatus has started processing for shutdown or reboot;
    storing the first identification information into the information storage unit;
    creating second identification information of a second recording device connected to the information processing apparatus when the information processing apparatus has started processing for boot;
    determining by the information processing apparatus whether the first identification information matches the second identification information; and
    deciding that the first recording device is attached to or detached from the information processing apparatus and then outputting a decision result, when the information processing apparatus determines that the first and second identification information do not match.

2. An information processing apparatus which creates recording device identification information relating to an accessible recording device by detecting attaching or detaching of a recording device, comprising:
   an information storage unit storing first identification information of a first recording device connected to said information processing apparatus; and
   at least one processor, coupled to said information storage unit,
      creating the first identification information when said information processing apparatus has started processing for shutdown or reboot,
      creating second identification information of a second recording device connected to said information processing apparatus when processing for boot has started,
      determining whether the first identification information matches the second identification information,
      deciding whether the first recording device is attached to or detached from said information processing apparatus based on said determining, and
      outputting a decision result indicating that the first recording device is detached from the computer upon determining that the first and second identification information do not match.

3. The information processing apparatus as set forth in claim 2, wherein said at least one processor updates the first identification information stored in said information storage unit when any recording device is attached or detached during a period from booting until starting processing for shutdown or reboot.

4. A non-transitory computer readable storage medium having computer readable program code embodied therein for monitoring attaching or detaching of a recording device to or from a computer executing the computer readable program code by a method comprising:
   creating first identification information of a first recording device connected to the computer when the computer has started processing for shutdown or reboot;
   storing the first identification information;
   creating second identification information of a second recording device connected to the information processing apparatus when the information processing apparatus has started processing for boot;
   determining whether the first identification information matches the second identification information;
   deciding whether the first recording device is attached to or detached from the computer based on said determining; and
   outputting a decision result indicating that the first recording device is detached from the computer upon determining that the first and second identification information do not match.

* * * * *